United States Patent
Hinterberger et al.

(10) Patent No.: US 9,902,283 B2
(45) Date of Patent: Feb. 27, 2018

(54) BATTERY FOR A MOTOR VEHICLE, MOTOR VEHICLE, AND METHOD FOR OPERATING A BATTERY

(71) Applicant: AUDI AG, Ingolstadt (DE)

(72) Inventors: Michael Hinterberger, Großmehring (DE); Berthold Hellenthal, Schwanstetten (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/551,154

(22) PCT Filed: Feb. 15, 2016

(86) PCT No.: PCT/EP2016/053164
§ 371 (c)(1),
(2) Date: Aug. 15, 2017

(87) PCT Pub. No.: WO2016/131771
PCT Pub. Date: Aug. 25, 2016

(65) Prior Publication Data
US 2018/0029494 A1 Feb. 1, 2018

(30) Foreign Application Priority Data
Feb. 18, 2015 (DE) .................. 10 2015 002 152

(51) Int. Cl.
*H02J 7/00* (2006.01)
*B60L 11/18* (2006.01)
(Continued)

(52) U.S. Cl.
CPC ....... *B60L 11/1866* (2013.01); *H01M 2/1077* (2013.01); *H01M 10/425* (2013.01);
(Continued)

(58) Field of Classification Search
CPC ...... H02J 7/0014; H02J 7/0016; H02J 7/0018; H02J 7/0019; H02J 5010/02; H01M 2/03;
(Continued)

(56) References Cited

U.S. PATENT DOCUMENTS 5,710,504 A * 1/1998 Pascual ................. H02J 7/0018
180/65.8
5,814,970 A * 9/1998 Schmidt .............. H01M 10/441
320/118
(Continued)

FOREIGN PATENT DOCUMENTS

DE  10 2013 207 508 A1  10/2014
DE  10 2014 101 391 A1  10/2014
(Continued)

OTHER PUBLICATIONS

Examination Report dated Nov. 27, 2015 of corresponding German application No. 10 2015 002 152.4; 4 pgs.
(Continued)

*Primary Examiner* — Drew A Dunn
*Assistant Examiner* — Michael Dibenedetto
(74) *Attorney, Agent, or Firm* — Maier & Maier, PLLC

(57) ABSTRACT

A battery for a motor vehicle with at least two adjacently arranged battery cells. A boundary surface of a first one of the at least two battery cells has a first electrically conductive surface coupled to a first actuating device and a boundary surface of a second one of the at least two battery cells has a second electrically conductive surface coupled to a second actuating device. The two electrically conductive surfaces are arranged electrically insulated from one another and form a capacitor element. The actuating devices are designed to transfer energy between the first of the at least
(Continued)

two battery cells and the second of the at least two battery cells by generating an alternating electric field in the capacitor element.

9 Claims, 4 Drawing Sheets

(51) Int. Cl.
*H01M 2/10* (2006.01)
*H01M 10/42* (2006.01)

(52) U.S. Cl.
CPC ............ *H01M 10/4264* (2013.01); *H01M 2010/4271* (2013.01); *H01M 2010/4278* (2013.01); *H01M 2220/20* (2013.01)

(58) Field of Classification Search
CPC .. H01M 2/0303; H01M 2/0207; H01M 2/021; H01M 2/2012; H01M 2/0215; H01M 2/0217; H01M 2/0222; H01M 2/0237; H01M 2/024; H01M 10/0413
USPC .................................. 320/116–120, 166, 167
See application file for complete search history.

(56) References Cited

U.S. PATENT DOCUMENTS

| | | | | |
|---|---|---|---|---|
| 9,203,118 | B2* | 12/2015 | Lenz | H01M 10/6551 |
| 2012/0139493 | A1* | 6/2012 | Sakurai | H02J 7/0016 |
| | | | | 320/118 |
| 2012/0242144 | A1 | 9/2012 | Chorian et al. | |
| 2013/0057198 | A1* | 3/2013 | Gerlovin | H02J 7/0019 |
| | | | | 320/103 |
| 2014/0184161 | A1* | 7/2014 | Deal | H02J 7/0014 |
| | | | | 320/121 |
| 2016/0043578 | A1* | 2/2016 | Miyamoto | H02J 7/0016 |
| | | | | 320/118 |
| 2016/0254683 | A1* | 9/2016 | Matsumoto | H02J 7/0014 |
| | | | | 320/118 |

FOREIGN PATENT DOCUMENTS

| | | |
|---|---|---|
| KR | 10-2014-0034132 A | 3/2014 |
| KR | 10-2014-0110574 A | 9/2014 |

OTHER PUBLICATIONS

International Search Report and Written Opinion dated May 10, 2016 of corresponding International application No. PCT/EP2016/053164; 20 pgs.

Notification of Transmittal of Translation of the International Preliminary Report on Patentability dated Aug. 31, 2017, in connection with corresponding international application No. PCT/EP2016/053164 (7 pgs.).

English translation of a Korean Office Action dated Oct. 23, 2017, in connection with corresponding KR Application No. 10-2017-7025964 (8 pgs.).

* cited by examiner

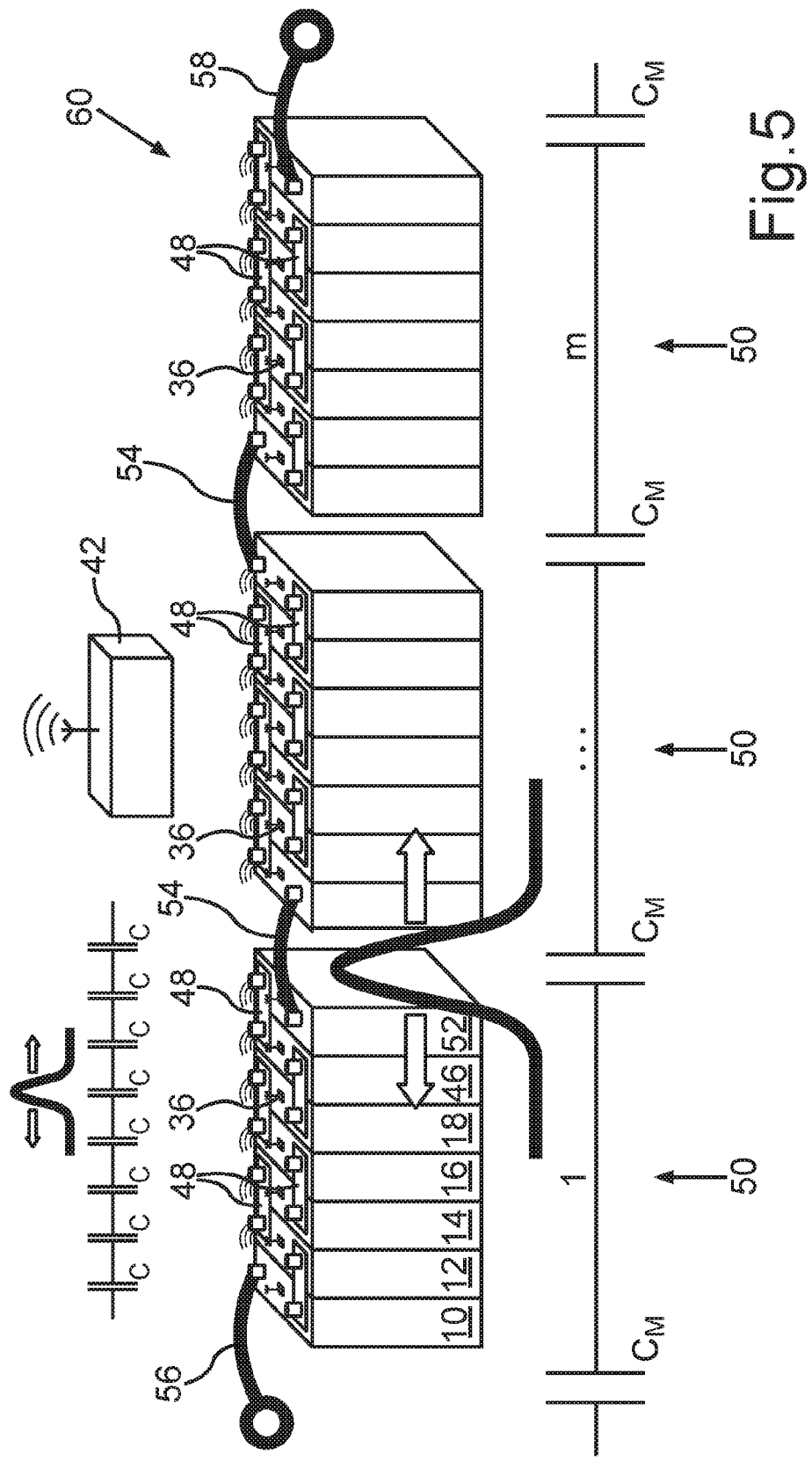

BATTERY FOR A MOTOR VEHICLE, MOTOR VEHICLE, AND METHOD FOR OPERATING A BATTERY

FIELD

The invention relates to a battery for a motor vehicle. Furthermore, the invention relates to a motor vehicle with such a battery. Moreover, the invention relates to a method of operating such a battery.

BACKGROUND

Lithium ion batteries or battery systems have established themselves in practically every field of mobile energy storage thanks to their high energy and power density, whether it be pedelecs, power tools, hybrid drives, electric vehicles, or even railway applications. At the same time, lithium ion battery systems are becoming increasingly important for stationary energy storage systems. Many lithium ion cells or their cell chemistry are characterized by a flat curve of their state of charge versus voltage. In the marginal regions below around 10% and above 90% state of charge (SoC), however, the voltage level of the battery cells changes very quickly. Over time, the battery cells might drift apart in their voltage level. This may occur due to various effects, such as different rates of self-discharge, inhomogeneous temperatures in operation or also premature aging of certain cells in a battery grouping, or also due to different lots (delivery from different manufacturing lots). A battery system made from such a cell grouping should only be discharged or charged until a battery cell has reached an upper or lower threshold value of the voltage. Battery management systems (BMS) therefore also have the task of counteracting this drifting apart of the cell voltages in a battery—in this context, one speaks of a "balancing". This is employed in order to preserve the complete usable capacitance of a battery or a battery system.

Without "cell balancing", the "weakest" battery cell in a multi-cell battery system determines the capacitance of the overall system. Furthermore, the "weakest" battery cell determines how much energy can be taken up or delivered. This is especially relevant for high-voltage batteries in which a plurality of battery cells are hooked up in series in order to achieve a corresponding overall voltage. By a high-voltage battery in a vehicle is usually meant a battery with a voltage higher than 60 volts, and depending on the purpose of use the chosen voltage may amount to several hundred volts. At present, battery management systems for batteries are usually designed so that passive battery cell balancing ensures a balanced state in regard to the battery cell voltages or battery capacitances. Due to the fact that usually very many battery cells are connected in series in a battery, it is of course very important for all battery cells to be equally loaded—if possible—in the case of a bidirectional current loading of all battery cells (series circuit).

One possibility is to provide a resistive bypass across each individual battery cell, which can be controlled so that any given portion of the charge current will bypass the battery cell. The drawback is that in this case a disproportionately large portion of charge energy is transformed into heat, until such time as all battery cells are fully charged, and that the "balancing" in theory only works during charging mode and does not work during the discharging. Also a balancing occurs during standby of a battery, which may lead to a gradual discharging of the battery. Among stationary applications, active charge balancing devices are known which also provide a balancing among individual battery cells during discharge mode. These DC/DC converters, realized on the basis of transformers, on the one hand require a complex and costly circuitry and lead to both a larger space requirement and a greater weight, which is a particularly negative consideration for mobile applications.

SUMMARY OF THE DISCLOSURE

Therefore, an object of the present invention is to provide a battery that requires an internal charge balancing with slight circuitry expense and space requirement. Furthermore, another object of the invention is to provide a motor vehicle with such a battery as well as a method for operating such a battery.

The invention starts from a battery for a motor vehicle with at least two adjacently arranged battery cells, which is further developed in that a boundary surface of a first one of the at least two battery cells has a first electrically conductive surface coupled to a first actuating device and a boundary surface of a second one of the at least two battery cells has a second electrically conductive surface coupled to a second actuating device, wherein the two electrically conductive surfaces are arranged electrically insulated from one another and form a capacitor element. The actuating devices are designed to transfer electrical energy between the first of the at least two battery cells and the second of the at least two battery cells by generating an alternating electrical field in the capacitor element.

In terms of method, the invention starts from a method for operating a battery for a motor vehicle with at least two adjacently arranged battery cells, which is further developed by transferring electrical energy between a first one of the at least two battery cells and a second one of the at least two battery cells by generating an alternating electrical field in a capacitor element, wherein a boundary surface of a first one of the at least two battery cells has a first electrically conductive surface coupled to a first actuating device and a boundary surface of a second one of the at least two battery cells has a second electrically conductive surface coupled to a second actuating device. The two electrically conductive surfaces are arranged electrically insulated from one another and form the capacitor element.

The battery cells each comprise a galvanic element, which is hereafter also called the active part of the respective battery cell. This is designed as a secondary element, which can be discharged to supply an electrical component and recharged after it has been discharged. The galvanic element comprises, in known manner, the arrester, for example in the form of metal foils that are coated with the electrochemically active material of the electrodes of the galvanic element. Moreover, an electrolyte is provided, as well as a separator which keeps apart the electrochemically active materials. In such a galvanic element, the arresters may be stacked, folded, or coiled, so that the galvanic element is also called a cell stack or cell coil.

In the concept proposed here, an especially advantageous implementing of the active balancing or energy transfer can be realized with the help of capacitances. The major benefit of a capacitive energy transfer, which is based on a displacement current resulting from a varying electric field, is that little energy is lost in the form of heat. At present, powers in the range of around 5 to 10 Watts can already be transferred without problems. The almost loss-free capacitive energy transfer is thus especially suitable for use with an intelligent battery cell that has an active charge balancing function. An "active balancing" with individual charging and discharging of battery cells is thus suitable for preserving the maximum capacitance of a battery module, that is, an arrangement of interconnected battery cells designed to form a grouping, over the service life and a balanced state of charge (SoC). The overall battery system can be better utilized in this way, so that the overall efficiency and the effectively usable capacitance are increased. Consequently, the driving range of electric vehicles or hybrid vehicles is also increased, for example.

In one preferred embodiment, the actuating device of the first of the at least two battery cells is coupled to a higher-level control device and/or to the actuating device of the second of the at least two battery cells via a communication link for control of an active charge balancing between the first of the at least two battery cells and the second of the at least two battery cells. Preferably, the communication link can be wireless, especially via a local radio connection such as ZigBee, Bluetooth, WLAN, or the like. Preferably the actuating devices can be designed to relay information on the state of the particular battery cell to the higher-level control device, which then ascertains from the totality of available data the battery cells between which an energy exchange should occur, and in this way controls the active charge exchange between the individual battery cells. This achieves the advantage that the individual actuating devices can be operated in coordination, so that, in particular, needless energy transfers between battery cells can be avoided.

In a preferred enhancement, the higher-level control device is designed to assign a set point for energy to be taken from the first of the at least two battery cells and to provide this set point to the actuating device of the first of the at least two battery cells via the communication link. The actuating device in this case is designed to generate the alternating electric field in the capacitor element in dependence on the set point so provided. Thus, for example, the higher-level control device can order the withdrawing of electrical energy in the form of electrochemically stored energy from the first battery cell. Moreover, it can order this to be transferred via the corresponding actuating device across one or more capacitor elements which are formed between two adjacent battery cells, without energy being diverted from the transmission pathway in this process. Finally, it can order the energy in another battery cell of the chain to be coupled back into this battery cell via the actuating device therein, and to be stored therein as electrochemical energy. The capacitive energy transfer according to the proposed concept thus enables a convenient relaying of energy from one battery cell to another, while it is not necessary to first deposit the energy in the cell itself and then take it out once more. This also affords the possibility, in particular, of not further loading battery cells that do not need either a charging or a discharging during the balancing process.

In one preferred embodiment, the first electrically conductive surface and the second electrically conductive surface are formed by a housing of the particular cell of the at least two battery cells. In this case, the housing is arranged insulated from the active part of the respective battery cell, that is, there is no direct electrical connection to one of its electrodes or to an electrolyte, to a connection terminal element, for example in the form of a plus or a minus pole terminal, or some other element standing in a direct electrical connection with a galvanic element of the battery cell.

This produces, especially in the case of so-called prismatic cells, in which the electrodes are composed of flat stacks and which thus usually have a rectangular base surface, a nearly ideal plate capacitor across the two adjacent side surfaces of two housings, whose dielectric can be provided by an additionally introduced thin insulating foil, which is inserted between the two housings of the battery cells. Such a foil can also be already placed on the housing of the battery cell before it is installed in the battery. This produces a double insulation between the individual housings of the battery cells, having the advantage that the likelihood of a total failure of the insulation is significantly reduced, even in event of damage or a material defect. Alternatively, an insulation of the individual battery cells may also be composed of an applied paint or some other plastic coating.

Preferably, the battery comprises at least a third battery cell, wherein the first actuating device is designed to remove electrochemically stored energy in the first battery cell and transfer this by generating the alternating electric field in the capacitor element, to channel the electrical energy across the second of the battery cells without intermediate storing of the energy electrochemically in the second battery cell, and wherein a third actuating device is designed to store the channeled electrical energy in the third of the battery cells. Thus, thanks to the concatenated plate capacitor arrangement, it is possible to pass on directly the quantity of energy to be distributed by means of the actuating devices to the next battery cell, that is, without an intermediate storing in electrochemical form by a charging and subsequent discharging of the battery cell located in the transfer path, in a dynamic and targeted manner. In this way, the service life of the battery cells can be increased significantly and the performance of the overall battery system can be enhanced. Energy losses which are unavoidable in the case of converting electrical energy into energy stored electrochemically in the galvanic element and back again can thus be reduced to a minimum.

In another preferred embodiment, the battery comprises at least two battery modules, wherein the at least two battery modules each comprise an electrically conductive module surface coupled to a module actuating device, which are arranged electrically insulated from each other, and form a module capacitor element, wherein the module actuating devices of the respective battery module are designed to transfer electrical energy between the at least two battery modules by generating an alternating electric field in the module capacitor element. This has the advantage that, in larger battery arrangements with a larger number of battery cells, which are especially necessary for a high-voltage installation, energy to be transferred for a charge balancing between individual battery cells does not necessarily need to be transferred across each individual battery cell according to their arrangement to one another, but rather an energy transfer from battery module to battery module is made possible and thus a shorter transmission pathway is achieved. Thus, on the one hand, energy can be transferred directly from one module to the next or, according to the transfer principle already explained for individual cells, to a further distant battery module, and at the same time an energy exchange between individual battery cells can also occur within a module.

In an especially advantageous enhancement, the module actuating devices are coupled to the totality of the battery cells forming a respective battery module. In this way, only one additional module actuating device per module is required, which is then preferably supplied with the entire battery voltage available within the battery module. Thus, in this case an energy exchange occurs between individual battery modules as a common block of the battery cells located therein, and in this case an energy exchange between individual battery cells only occurs within a battery module.

Alternatively, a parallel coupling of each individual battery cell to a module surface can be provided. This affords the advantage that each individual battery cell can exchange energy directly with another battery cell of another battery module "in the passing lane", so to speak, via a coupling path of the battery modules with each other. In order for individual battery cells to also be coupled at the same time to the module surface, an option of synchronized energy supply can be provided for the individual actuating devices.

In another preferred embodiment, the actuating device is formed by a single integrated circuit as well as passive components. For example, since the entire functionality required for an "active balancing" is integrated in a "smart-cell semiconductor chip", an especially economical and space-saving construction can be achieved. In this case, only other additional passive components are needed, particularly including transformers, inductances, capacitors or resistances, for example to construct a resonance circuit with an inductance and a capacitor. Preferably a transformer may also be used, enabling a voltage adaptation. With higher potential on the capacitor element (coupling capacitance), the capacitively transferable energy also increases.

The motor vehicle according to the invention comprises at least one battery according to the invention. The motor vehicle, for example, can be designed as a passenger car, especially an electric vehicle or hybrid vehicle. Furthermore, the motor vehicle may also be an electrically operated motorcycle or an electrically operated bicycle. In particular, the higher-level control device may be coupled to a bus system, such as a CAN bus, of the motor vehicle, by which information as to the state of the battery can be conveniently made available.

It is furthermore possible to provide the battery in a stationary energy supply system. Furthermore, it may be provided to recycle the battery, which had been provided in a motor vehicle, as a so-called second-life battery, i.e., the battery is introduced into different kind of usage. In particular, in the case of second-life applications, the requirements on the performance of the battery cells may be lower than when the battery cells are used for the battery of the motor vehicle.

The advantages and preferred embodiments described for the battery according to the invention apply equally to the corresponding motor vehicle.

The advantages and features as well as preferred embodiments described for the device according to the invention and the motor vehicle according to the invention apply equally to the corresponding method, and vice versa. Consequently, corresponding method features may be provided for device features and vice versa.

The features and combinations of features mentioned above in the description, as well as the features and combinations of features mentioned below in the description of the figures and/or shown in the figures can be used not only in the particular indicated combination, but also in other combinations or standing alone, without leaving the scope of the invention. Thus, embodiments not explicitly shown in the figures or explained, yet emerging from the explained embodiments and able to be created by separate combinations of features, are to be regarded as comprised and disclosed by the invention.

BRIEF DESCRIPTION OF THE DRAWINGS

Further advantages and features will emerge from the following description of exemplary embodiments, taking into account the appended figures. The same reference numbers designated in the figures denote the same features and functions.

Shown herein are:

FIG. 5 a simplified schematic representation of the energy transfer at the module level between individual cells as well as the energy transfer on the battery system level between individual battery modules.

DETAILED DESCRIPTION OF THE DRAWINGS

Figure 1:
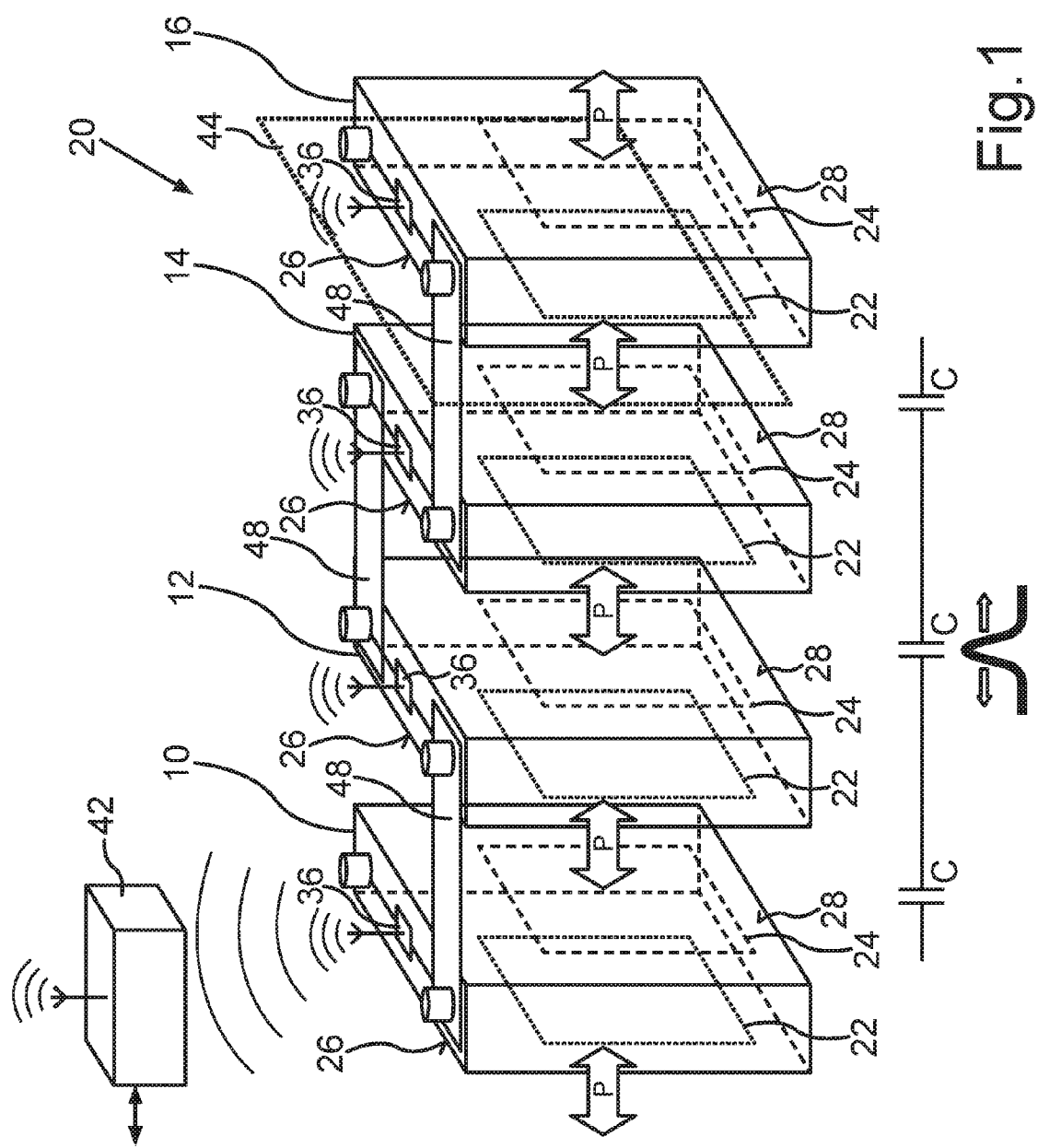
FIG. 1 in a simplified schematic perspective view, an excerpt from a first variant of a battery with battery cells, in which capacitive energy transfer is possible.

FIG. 1 shows in a schematic perspective view an excerpt from a battery 20 with adjacently arranged battery cells, of which only the battery cells 10, 12, 14, 16 are represented as an example. In the present configuration, the battery 20 is a storage battery, which is part of the electrical system of a motor vehicle, which is not shown, and serves for the electrical power supply of an electric drive of the motor vehicle.

The battery cells 10, 12, 14, 16 here are connected in a series circuit and connected in electrically conductive manner by current bus bars 48. Each of the battery cells 10, 12, 14, 16 is designed as a lithium ion cell and has a substantially cuboidal external structure. The cuboidal structure provides oppositely situated lateral boundary surfaces 26, 28. The boundary surfaces 26, 28 are formed from an electrically insulating material, in the present case, a plastic. On the boundary surfaces 26, 28 there are arranged a first and a second electrically conductive surface 22, 24 by means of an adhesive connection. The electrically conductive surfaces 22, 24 are arranged electrically insulated from one another, not only in regard to the respective battery cell 10, 12, 14, 16, but also with respect to the oppositely situated electrically conductive surface 22, 24 of the neighboring battery cells 10, 12, 14, 16. In the present case, an electrically insulating film 44 of an insulating material such as polyamide is arranged each time between the opposite electrically conductive surfaces 22, 24 of adjacent battery cells 10, 12, 14, 16. In the present configuration, it is provided that the boundary surfaces 26, 28 are directly adjacent to each other, with the respective electrically conductive surfaces 22, 24 of adjacent battery cells 10, 12, 14, 16 across the respective insulating film 44.

Since electrical insulation is found between the individual battery cells 10, 12, 14, 16 in the form of the insulating film 44, for example, a plate capacitor can be formed in this way as is evident from FIG. 1. The electrically conductive surfaces 22 and 24 belonging to a battery cell 10, 12, 14, 16 can be actuated not only electrically insulated from each other, but also can be actuated jointly at the same potential. In particular, it may be provided that the electrically conductive surfaces 22 and 24 are part of an electrically conductive housing of the respective battery cell 10, 12, 14, 16, not having any galvanic connection to the active part, i.e., the galvanic element, the battery cell 10, 12, 14, 16, and especially the two electrical connection terminals of the battery cell.

Figure 2:
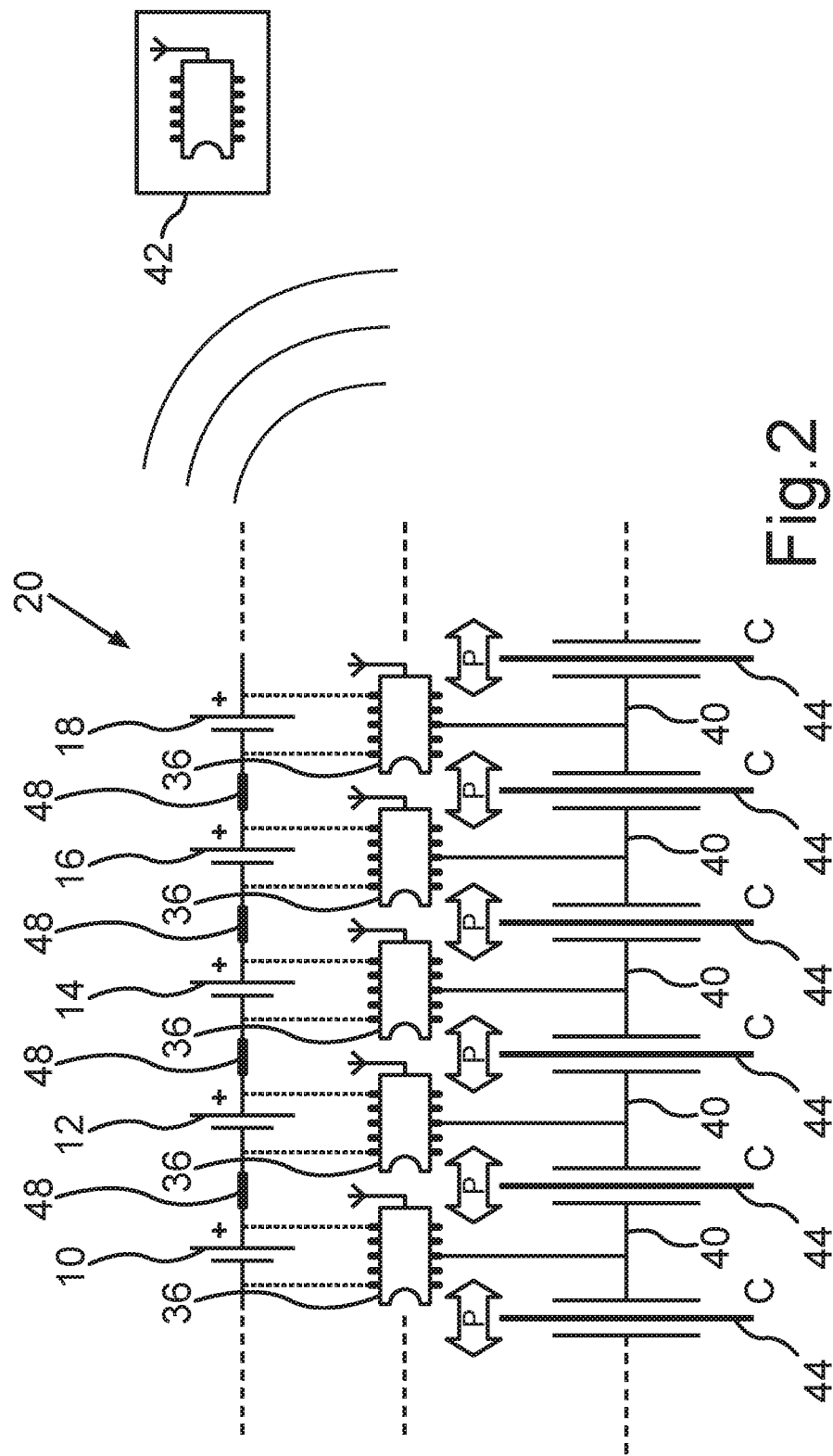
FIG. 2 a schematic circuit diagram of the arrangement according to FIG. 1.

As represented in FIG. 2, the individual housings 40 of the battery cells 10, 12, 14, 16 as well as yet another battery cell 18 shown, which is designed like the other battery cells 10, 12, 14, 16, form each time with an adjacent housing 40 a plate capacitor C. Consequently, energy can be transferred by the concatenated arrangement of the plate capacitors C from one battery cell 10, 12, 14, 16, 18 to the neighboring battery cells 10, 12, 14, 16, 18 (left or right) and back.

In the energy transfer from battery cell 10, 12, 14, 16, 18 to battery cell 10, 12, 14, 16, 18, which is represented symbolically by the double arrow P, it is not absolutely necessary for the amount of energy being transferred to be stored first in the respective battery cell 10, 12, 14, 16, 18 located in the transfer pathway or, consequently, to be withdrawn again, possibly operating the battery cell 10, 12, 14, 16, 18 in this way outside the bounds set by the battery cell chemistry. Thus, for example, it is possible to transfer energy directly from the battery cell 12 via the concatenated arrangement of the respective housings 40 of the battery cells 14 and 16 to the battery cell 18, where the energy withdrawal may occur by a corresponding actuating device 36. Thanks to the concatenated plate capacitor arrangement, it is possible each time to pass on to the next battery cell 10, 12, 14, 16, 18 in a dynamic and targeted manner the energy amounts being transferred directly in an "active balancing" concept without removing those amounts and then feeding them back into the capacitive coupling path.

As already mentioned above, the concatenated plate capacitors C especially preferably are realized by means of the housing 40 as a "capacitor plate". The housings 40 are usually made of aluminum and are typically present in insulated form against the active part of the battery cells 10, 12, 14, 16, 18. The housing 40 here is connected only to the actuating device 36 and the latter is itself connected electrically to the active part of the battery cell (plus and minus connection terminals). In the event that the housing 40 is not suitable for an insulated construction, the further possibility exists of realizing capacitor elements C as plate capacitors between the battery cells in the form of the electrically conductive surfaces 22 and 24.

One of the battery cells 10, 12 14, 16, 18 can communicate each time with a higher-level control device 42, for example in wireless manner. The control device 42 can determine the energy demand required over all battery cells 10, 12 14, 16, 18 and partition it according to a predetermined intelligent algorithm by the active balancing principle.

Figure 3:
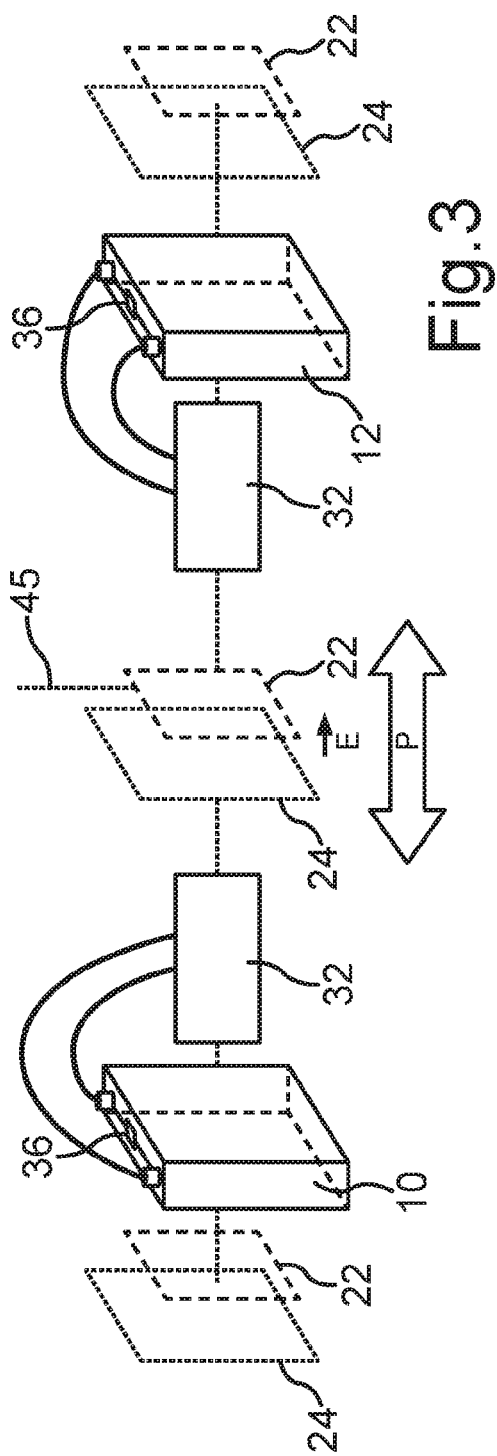
FIG. 3 a simplified schematic view of the capacitive energy transfer between battery cells.

FIG. 3 shows a simplified representation of the capacitive energy transfer between two battery cells 10, 12. Both the battery cell 10 and the battery cell 12 each have the control and monitoring device 36, which is coupled to a sending and receiving unit 32 (transceiver Tx/Rx). The sending and receiving unit 32 may also be part of the control and monitoring device 36. The sending and receiving unit 32 here is electrically coupled to the two terminals, that is, plus and minus poles, of the respective battery cell 10 or 12. Furthermore, the sending and receiving units 32 are each electrically coupled to the first electrically conductive surface 22 and to the second electrically conductive surface 24 belonging to the respective battery cells 10, 12. Thus, at a galvanic separating surface 45 there is produced a plate capacitor C from the first conductive surface 22, belonging to the battery cell 12, and the second electrically conductive surface 24, belonging to the battery cell 10. By this plate capacitor C, with the aid of a variable electric field E ($\vec{E}$), an energy transfer can occur via a resulting electric displacement current, represented by a double arrow P symbolizing the capacitive energy transfer. Since the capacitive energy transfer is based on the displacement of charge carriers in the electric field, almost no ohmic losses occur in this way. Thus, very high efficiencies can be achieved, especially when only small amounts of energy are being transferred.

The two electrically conductive surfaces 22 and 24 may be formed here as copper foils; they may be extremely thin, which is advantageous to the size of the battery cells 10, 12 14, 16, 18, and do not need to be supplemented with bulky components in order to create the additional transfer pathway. Preferably, these surfaces may also be metallized films, which have been provided with a conductive surface, for example, by vapor deposition with metal or by electrochemical deposition of metal. The form of the electrically conductive surfaces 22, 24 can be of any desired shape. In particular, neither is it necessary for a first conductive surface 22 belonging to the battery cell 12 and a second electrically conductive surface 24 belonging to the battery cell 10 to overlap completely.

The currently transferable powers with this type of energy transfer are at present around 5 to 10 Watts. Preferred frequencies for the capacitive energy transfer lie in the range of 100 kHz to 2 MHz. In order to boost the transferable power, the voltage is chosen as high as possible, while the possible level of the voltage is limited by the dielectric strength of the insulating film 44 owing to particular physical features.

Figure 4:
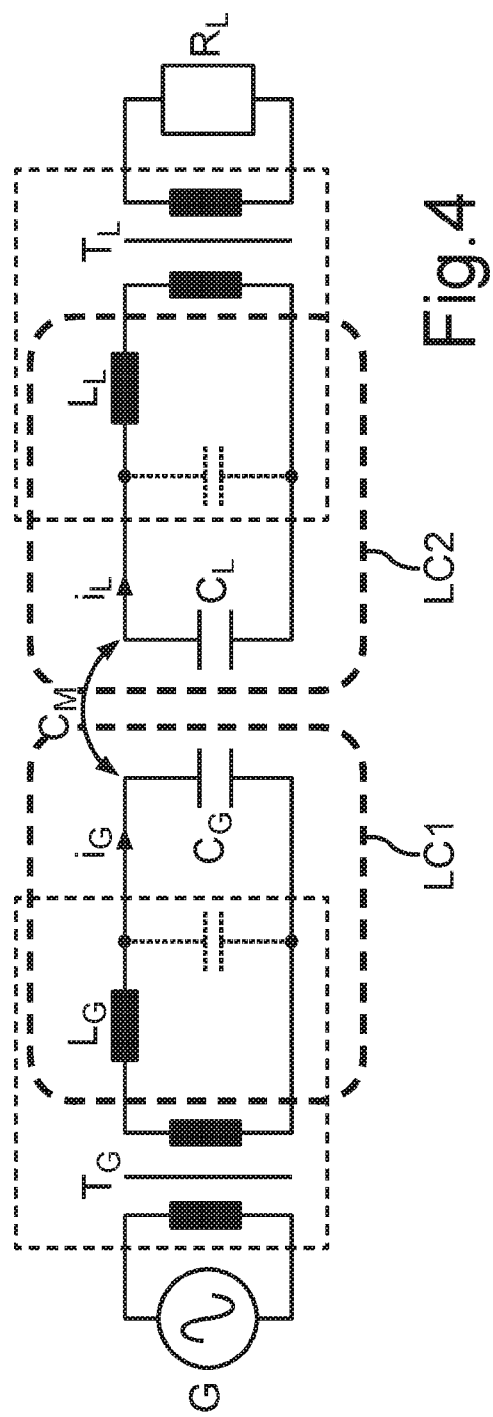
FIG. 4 a simplified schematic representation of the coupling principle of the capacitive energy transfer.

The coupling principle of capacitive energy transfer is explained below in FIG. 4.

A generator G feeds a primary winding of a transformer $T_G$. To a secondary output of the transformer $T_G$ is electrically coupled a resonance inductance $L_G$, which is coupled to a capacitance $C_G$ to form an electrical resonance series circuit LC1. The current through the capacitance $C_G$ is denoted as $i_G$. A second connection node of the secondary side of the transformer $T_G$ is electrically coupled to the capacitance $C_G$. The resonance frequency is furthermore influenced by an internal capacitance, shown by hatching, which is part of a transmitter circuit, indicated by broken lines, which is located between the generator G and the capacitance $C_G$. A mirror-image circuit is constructed on a load side, having a capacitance $C_L$ through which flows a current $i_L$. The capacitance $C_L$ together with an inductance $L_L$ forms a resonance series circuit LC2, which is electrically coupled to the secondary side of a transformer $T_L$. The resonance frequency, as on the generator side, is influenced by an internal capacitance, indicated by broken lines, which is part of a receiver circuit, also indicated by broken lines, located between the capacitance $C_L$ and a load $R_L$ electrically coupled to the primary side of the transformer $T_L$. A coupling capacitance $C_M$ is produced between the two midpoints of the two resonance circuits LC1 and LC2. By the midpoint of a resonance circuit is meant here the connection node of the resonance inductance and the resonance capacitance, for example $L_G$ and $C_G$. The other connection node of these two components is connected each time in the mentioned example to a connection terminal of the secondary side of the transformer $T_G$.

For example, the upper electrode of the capacitance $C_G$ is formed by the electrically conductive surface 24 coupled to the one sending and receiving unit 32 (left side of FIG. 3) and the upper electrode of the capacitance $C_L$ is formed by the electrically conductive surface 22 coupled to the other sending and receiving unit 32 (right side of FIG. 3). In this case, the lower electrode of the capacitance $C_G$ may be formed by the housing of the battery cell 10, having an electrical connection to the active part of the battery cell 10. Likewise, the lower electrode of the capacitance $C_L$ can be formed by the housing of the battery cell 12, having an electrical connection to the active part of the battery cell 12. The two housings then stand in a definite potential relation to each other across the current bus bars 48 (not shown in FIG. 3), constituting a low-impedance connection for a high-frequency signal. In the event that the respective housings 40 of the battery cells 10 and 12 are used instead of separate electrically conductive surfaces 22 and 24, which are then arranged insulated from the active part of the respective battery cell in this configuration, the lower electrode of the capacitance $C_G$ is given by the active part of the battery cell 10 and the lower electrode of the capacitance $C_L$ by the active part of the battery cell 12.

FIG. 5 shows a sample layout of a battery system 60 with two additional battery cells 46, 52, having several battery modules 50, which in turn have several battery cells 10, 12 14, 16, 18, 46, 52. The battery cells 10, 12 14, 16, 18, 46, 52 are connected in electrically conductive manner inside a battery module 50 by current bus bars 48. This may be an electrical series circuit, an electrical parallel circuit or a mixed series and parallel circuit. As already shown above, the electrically conductive surfaces 22 and 24, or the housings of the respective battery cell, form with the corresponding mating piece of the adjacently arranged battery cell 52 a capacitance C. Within a module, the individual battery cells 52 are numbered for example in succession from 1, 2, 3 to n. Thanks to the concatenated arrangement of the plate capacitors C of a battery cell 10, 12 14, 16, 18, 46, 52, energy can be transferred to a neighboring battery cell 10, 12 14, 16, 18, 46, 52 from left to right (10-12-14-16-18-46-52) or from right to left (52-46-18-16-14-12). Thus, the energy can be transferred through the entire battery module 50, as indicated by the symbol of a wave in FIG. 5. Thus, on the one hand, an energy transfer can occur directly to a neighboring battery cell 10, 12 14, 16, 18, 46, 52, from example from battery cell 12 to battery cell 14, or for example in the reverse direction from battery cell 46 to battery cell 18. However, it is also possible to transfer energy from the battery cell 12 to the battery cell 52, for example, without withdrawing energy from the intervening battery cells 14, 16, 18, 46 in the capacitive coupling pathway.

Moreover, individual battery cells 10, 12 14, 16, 18, 46, 52 can be grouped to form a battery module 50. The battery module 50 in particular may have a common electrode in the form of one or more electrically conductive surfaces, which form with the neighboring battery module 50 a coupling capacitance $C_M$. The battery modules 50 here are electrically interconnected by module connection elements 54. As already proposed for the cell level, also on the module level there may be a series circuit, a parallel circuit or a combined series and parallel circuit of the individual modules 50. The battery 60 furthermore has a battery plus terminal 56 and a battery minus terminal 58. Moreover, it is possible, even on the battery level, to implement a capacitive energy transfer from battery module 50 to battery module 50. A corresponding coupling point is provided for this between the battery modules. In the most simple case, these coupling points can be realized as simple plate capacitors and integrated in the battery 60. The control device 42 as a higher level unit is responsible for the defined energy exchange.

A simultaneous coordinated capacitive energy exchange between several battery modules 50 is also possible (multi-energy transfer), without this being hindered mutually as a result of interferences. Thus, for example, it may also be provided that the first electrically conductive surface 22 and the second electrically conductive surface 24 are arranged electrically independent of each other and can be actuated separately. In this way, each time in a first step only an energy transfer occurs to a directly adjacent battery cell 10, 12 14, 16, 18, 46, 52 in a particular direction. In this way, a simultaneous energy exchange can occur at many places of the battery 60 at the same time, without requiring for example a synchronization of the feed-in phases and frequencies. It may also be provided to have a temporary electrical coupling between the first electrically conductive surface 22 and the second electrically conductive surface 24, if the energy is only being channeled across the cell.

The energy transfer from the battery module 50 to the neighboring battery module 50 in a chain of m battery modules 50 is shown in the representation of FIG. 5 for m=3. The energy transfer represented symbolically as a wave is indicated here between the first battery module 50 and the middle battery module 50.

It may be provided that each of the battery cells 10, 12 14, 16, 18, 46, 52 within a battery module 50 can be capacitively coupled to the corresponding electrically conductive surface of the battery module 50. Alternatively or additionally, it can also be provided that all battery cells 52 within the battery module 50 in the given electrical circuit are capacitively coupled jointly via a single sending and receiving unit 32 to the corresponding electrically conductive surface which is required to form the coupling capacitance $C_M$ for an adjacently arranged battery module 50. The battery modules 50 may also be arranged in several levels one on top of another. In this case, corresponding coupling units are provided from bottom to top to provide a capacitive coupling pathway.

Even though the capacitive energy transfer has been explained with the aid of batteries in the context of motor vehicles, it is clear to the skilled person that the application itself is not limited to this application. The capacitive energy transfer may of course also be used in stationary electrical layouts, especially in the field of electrical switching layouts. Here as well the advantage emerges especially clearly, preferably when used in uninterrupted power supplies, especially for safety-relevant functions. This is especially of major advantage for electrical layouts in signals engineering or communications technology.

Thus, it has been shown above how an energy transfer can be configured by means of capacitive coupling units, especially by the use of plate capacitors or the housing 40 itself for the capacitive energy transfer.

The invention claimed is:

1. A battery for a motor vehicle with at least two adjacently arranged battery cells, comprising:
   a boundary surface of a first one of the at least two battery cells has a first electrically conductive surface coupled to a first actuating device and a boundary surface of a second one of the at least two battery cells has a second electrically conductive surface coupled to a second actuating device, wherein the two electrically conductive surfaces are arranged electrically insulated from one another and form a capacitor element, wherein the actuating devices transfer electrical energy between the first of the at least two battery cells and the second of the at least two battery cells by generating an alternating electric field in the capacitor element.

2. The battery according to claim 1, wherein the actuating device of the first of the at least two battery cells are coupled to a higher-level control device and to the actuating device of the second of the at least two battery cells via a communication link for control of an active charge balancing between the first of the at least two battery cells and the second of the at least two battery cells.

3. The battery according to claim 2, wherein the higher-level control device is designed to assign a set point for energy to be withdrawn from the first of the at least two battery cells and to provide this set point to the actuating device of the first of the at least two battery cells via the communication link, and the actuating device is designed to generate an alternating electric field in the capacitor element as a function of the set point so provided.

4. The battery according to claim 1, wherein the first electrically conductive surface and the second electrically conductive surface are each formed by a housing of the respective one of the at least two battery cells.

5. The battery according to claim 1, wherein the battery has at least a third battery cell, wherein the first actuating device is designed to withdraw electrochemically stored energy in the first battery cell and transfer this by generating an alternating electric field in the capacitor element, to channel the electrical energy across the second of the battery cells without intermediate storing of the energy electrochemically in the second battery cell, and a third actuating device is designed to store the channeled electrical energy in the third of the battery cells.

6. The battery according to claim 1, wherein the battery has at least two battery modules, wherein the at least two battery modules each have an electrically conductive module surface coupled to a module actuating device, which are arranged electrically insulated from each other, and form a module capacitor element, wherein the module actuating devices of the respective battery module are designed to transfer electrical energy between the at least two battery modules by generating an alternating electric field in the module capacitor element.

7. The battery according to claim 6, wherein the module actuating devices are coupled to the totality of the battery cells forming a respective battery module.

8. The battery according to claim 1, the actuating device is formed by a single integrated circuit as well as passive components.

9. A method for operating a battery for a motor vehicle with at least two adjacently arranged battery cells, comprising:

transferring electrical energy between a first one of the at least two battery cells and a second one of the at least two battery cells by generating an alternating electrical field in a capacitor element, wherein a boundary surface of a first one of the at least two battery cells has a first electrically conductive surface coupled to a first actuating device and a boundary surface of a second one of the at least two battery cells has a second electrically conductive surface coupled to a second actuating device, wherein the two electrically conductive surfaces are arranged electrically insulated from one another and form the capacitor element.

* * * * *